US008544936B2

(12) United States Patent
Lindner

(10) Patent No.: US 8,544,936 B2
(45) Date of Patent: Oct. 1, 2013

(54) DEVICE FOR CONNECTING FUNCTIONAL ELEMENTS TO A SUPPLY SOURCE

(75) Inventor: Gerhard Lindner, Ploessberg (DE)

(73) Assignee: Nexans, Paris (FR)

( * ) Notice: Subject to any disclaimer, the term of this patent is extended or adjusted under 35 U.S.C. 154(b) by 189 days.

(21) Appl. No.: 13/106,009

(22) Filed: May 12, 2011

(65) Prior Publication Data

US 2011/0308165 A1 Dec. 22, 2011

(30) Foreign Application Priority Data

Jun. 17, 2010 (EP) .................................... 10305649

(51) Int. Cl.
*B60J 5/06* (2006.01)

(52) U.S. Cl.
USPC ............................................ 296/155; 49/306

(58) Field of Classification Search
USPC ................ 296/155, 29, 190.11; 49/360, 502; 174/84 R, 70 R, 72 R, 68.3, 68.1, 72 C, 88 R, 174/70 C, 95
See application file for complete search history.

(56) References Cited

U.S. PATENT DOCUMENTS 6,494,523 B2 * 12/2002 Kobayashi .................... 296/155
6,685,253 B1 * 2/2004 Wolcott ........................ 296/155
6,781,058 B1 * 8/2004 DeCicco et al. ............ 174/72 A
6,940,019 B2 * 9/2005 Ikeda et al. .................. 174/68.3
6,996,967 B2 * 2/2006 Kobayashi ..................... 59/78.1
7,082,720 B2 * 8/2006 Kobayashi et al. ............. 49/360
7,730,669 B2 * 6/2010 Kida et al. .................... 296/155
8,247,921 B2 * 8/2012 Ushiyama et al. ........... 307/10.1
2002/0005014 A1 * 1/2002 Doshita et al. .................. 49/360
2004/0083655 A1 * 5/2004 Suzuki et al. ................... 49/360
2007/0157523 A1 7/2007 Kuhnen et al.

FOREIGN PATENT DOCUMENTS

DE 20200501913 4/2006

* cited by examiner

*Primary Examiner* — Glenn Dayoan
*Assistant Examiner* — Pinel Romain
(74) *Attorney, Agent, or Firm* — Sofer & Haroun, LLP

(57) ABSTRACT

A device for connecting functional elements is indicated which are arranged in a sliding door of a motor vehicle, with at least one supply source present in the body of the motor vehicle through lines which extend between the functional elements and the supply source. The sliding door is mounted on a carriage which is moveable back and forth in the bottom area of the motor vehicle essentially over the entire width of a door opening (3). Lines connected to a connection point (14) of the supply source are arranged in a guide chain (16) which is composed of mechanically stable chain links which are moveably connected to each other, wherein the guide chain is pivotally fastened with a first end to the sliding door and with a second end in the area of the connection point (14) to the body of the vehicle. An elbow (19) is arranged along the length of the guide chain (16) in the vicinity of the connection point (14) through which the guide chain (16) is raised with its second end to a level located above the upper edge of the carriage, while on the other side of the elbow (19) with the sliding door being in the closed position the guide chain is arranged below the bottom edge of the carriage.

2 Claims, 2 Drawing Sheets

1
2
4

9
16
19
3
14
18

DEVICE FOR CONNECTING FUNCTIONAL ELEMENTS TO A SUPPLY SOURCE

RELATED APPLICATION

This application claims the benefit of priority from European Patent Application No. 10 305 649.5, filed on Jun. 17, 2010, the entirety of which is incorporated by reference.

BACKGROUND

1. Field of the Invention

The invention relates to a device for connecting functional elements that are arranged in a sliding door of a motor vehicle. In the closed position, the sliding door closes a door opening The connection is effected to at least one supply source present in the body of the motor vehicle, through lines which extend between the functional elements and the supply source and are arranged in a guide chain which is composed of mechanically stable chain links which are movably connected to each other. The sliding door is mounted on a carriage which can be moved back and forth in the bottom area of the body of the motor vehicle essentially over the entire width of the door opening, wherein, in the area of the door opening of the motor vehicle, a connection point of the supply source is present for connecting the lines, and wherein the guide chain is attached with a first end to the sliding door and with a second end in the area of the connection point to the body of the motor vehicle.

2. Description of Related Art

Such a device is disclosed in DE 20 2005 019103 U1.

In the doors of modern motor vehicles, such as automobiles and trucks, in the following called vehicles for short, various functional elements are arranged which must be supplied with energy or signals. Such functional elements are, for example, electric motors for window lifting mechanisms, elements of a central locking system, an airbag, and loudspeakers. This applies generally to all doors of a vehicle, particularly also to sliding doors which for opening are not pivoted in hinges, but are initially pulled laterally out of the side wall of the body of the vehicle and are then pushed parallel to this side wall by means of so called travel carriages until an appropriate door opening is available in the side wall for passengers to board or leave the vehicle. For closing the vehicle, the described movements are carried out in the opposite direction.

Supply sources, in the following called sources for short, are in the sense of the invention, for example an electric current source, a radio, a sound reproduction device, and a signal source for electrical or optical signals, but also sources for hydraulic and pneumatic supplies. Connected to these sources are suitable lines which lead to the functional elements in a sliding door of the respective vehicle. Thus, lines can be electrical and optical lines as well as hoses. The vehicle has a connection point connected to a source to which the lines can be connected, for example, by sliding on.

For pulling out, pushing and closing a sliding door, the vehicles of different manufacturers have different mechanisms. In all embodiments, the lines required for supplying the functional elements must be able to follow a relatively long travel distance of the sliding door, without there being the danger of the lines being damaged. In addition, the lines must be arranged in such a way that they do not obstruct boarding and leaving the vehicle by the passengers.

From the above-mentioned DE 20 2005 019 103 U1 is known a device for connecting functional elements which are arranged in a sliding door of a motor vehicle, with at least one supply source which is present in the body of the motor vehicle by means of lines which extend between the functional elements and the supply source and are arranged in a guide chain which is composed of mechanically stable chain links that are movably connected to each other. The guide chain is connected with a first end to the sliding door and with a second end in the area of a connection point of the supply source to the body of the motor vehicle. The guide chain, which is called a drag chain, is composed of an upper drag chain and a lower drag chain which are connected to each other by a pivot bearing. The upper drag chain is accommodated in a guide duct present in the sliding door.

OBJECTS AND SUMMARY

The invention is based on the object of constructing the above-described device in such a way that, n the one hand, while being of simple construction, it ensures an effective protection of the lines, and, on the other hand, it does not impede free access to the vehicle.

In accordance with the invention, this object is met by providing an elbow along the extension of the guide chain in the area of the connection point to which the guide chain is pivotally attached, wherein the elbow raises the guide chain with its second end to a level which is above the upper edge of the carriage, while on the other side of the elbow with the sliding door in the closed position the guide chain is arranged below the bottom edge of the carriage.

The connection point of the source for connecting the lines can in this device be mounted far toward the bottom and thus, well protected in the vehicle against mechanical stress. The various lines are accommodated in the guide chain so as to be mechanically protected and are arranged with the guide chain as far as possible in the bottom area of the vehicle, so that the free access to the vehicle and disembarking from the vehicle are not impeded by structures which would increase the height of the door sill. On the one hand, this is realized in that, because of the elbow arranged in the guide chain, the second end of the guide chain mounted in the area of connection point is located above the carriage of the sliding door, which, consequently, can be moved without obstruction and without damage to the guide chain, or to the lines arranged in the guide chain, with the sliding door being open up to the corresponding edge of the door opening. As a result, when the sliding door is completely open, the opening of the door is available over its full width for entering and leaving the vehicle. On the other hand, when the sliding door is closed, the elbow makes possible a position of the guide chain in an area of the body of the vehicle near the bottom. Accordingly, not much space is required for the guide chain in the configuration of the vehicle body, so that the sill of the door opening—as already mentioned—can extend in the side wall of the vehicle as far as possible at the bottom of the vehicle body. Therefore, the clear height of the opening for entering and leaving the vehicle can be dimensioned as large as possible.

BRIEF DESCRIPTION OF THE DRAWINGS

An embodiment of the subject matter of the invention is illustrated in the drawing.

In the drawing.

DETAILED DESCRIPTION

Figure 1:
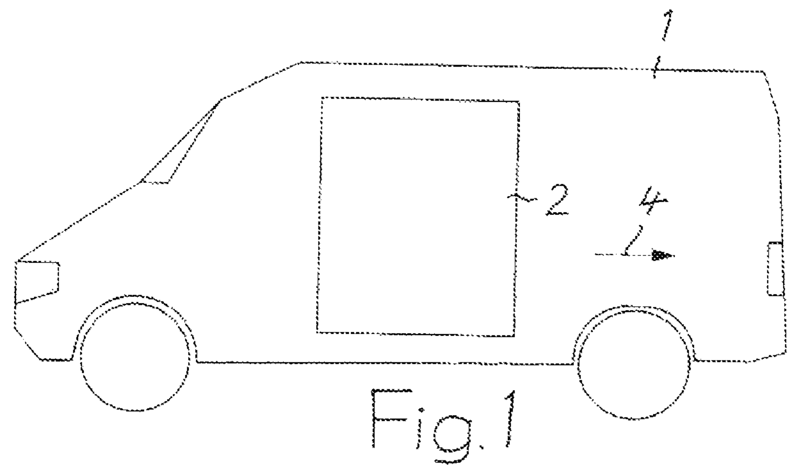
FIG. 1 is a side view of a vehicle.

FIG. 1 shows in a side view, for example, a van as the vehicle 1. The vehicle 1 has a sliding door 2 which closes a door opening 3 (FIGS. 2 and 3) in the side wall of the vehicle. For opening the slide door, it has to he pulled initially a short distance out of the side wall of the vehicle 1. The door can then he moved in the direction of the arrow 4 parallel to the side wall of the vehicle 1 until the door opening 3 is released.

For moving the sliding door 2, and particularly for its lateral displacement, the door is attached at the bottom to a so called travel carriage 5 which can be moved back and forth guided in the body of the vehicle in the direction of double arrow 6. The sliding door 2 has at least in its upper portion another support 7 which is also movably guided in the body of the vehicle 1. The carriage 5 engages, for example, with a projection 8, in a guide groove 9 (FIG. 3), provided in the body of the vehicle 1, wherein the groove also serves to support the carriage.

Figure 2:
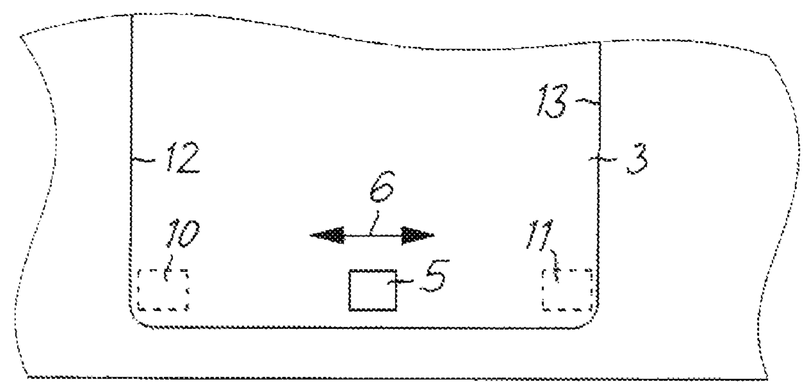
FIGS. 2 and 3 schematically show sections of a door opening of the vehicle, on a larger scale.

The carriage 5 is movable within door opening 3 between two end positions 10 and 11 shown in broken lines in FIG. 2. The end positions 10 and 11 are determined by the lateral limitations 12 and 13 of the door opening 3. When the carriage 5 is in end position 10, the sliding door is closed. In end position 11, it is open.

In the area of the limitation 13, a connection point 14 indicated by a small box is provided for connecting lines 15 (FIG. 5) which connect in the mounted position functional elements present in the side door 2 to at least one supply source (source) which is present in the vehicle. The lines can be provided at one end with plug-type connectors, so that they can be connected to the connection point 14 as well as to the functional elements of the sliding door by plugging in.

The lines 15 are after their assembly connected stationarily to the connection point 14 and the sliding door 2. Between these two points, the lines must be arranged so as to be movable in order to be able to follow the movements of the sliding door 2. For this movement, and for their protection against mechanical damage, the lines are accommodated in a guide chain 16 which is composed of a plurality of mechanically stable chain links 17 which are movably connected to each other. The guide chain 16 is connected at one end thereof to the sliding door 2 and at its other end in the area of the connection point 14 to a point of rotation 18 indicated by a circle, wherein each connection is a pivoting connection.

Figure 3:
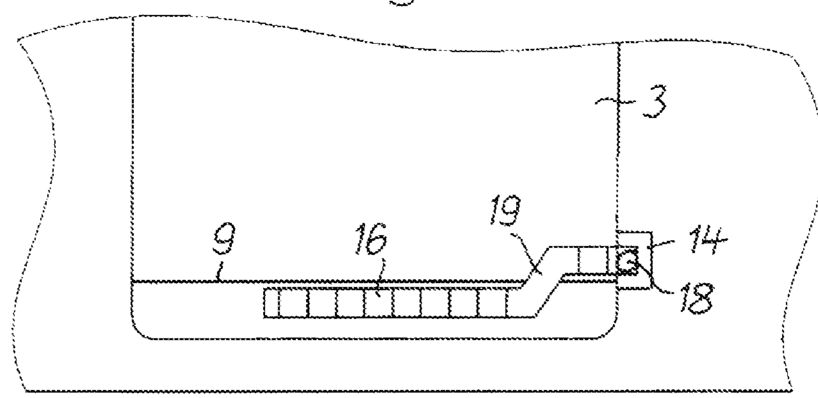
Figure 4:
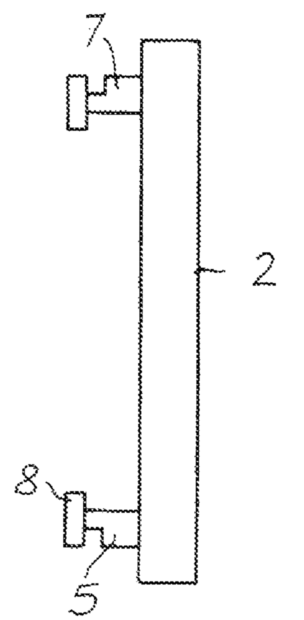
FIG. 4 is a side view of a sliding door of the vehicle according to FIG. 1.
Figure 5:
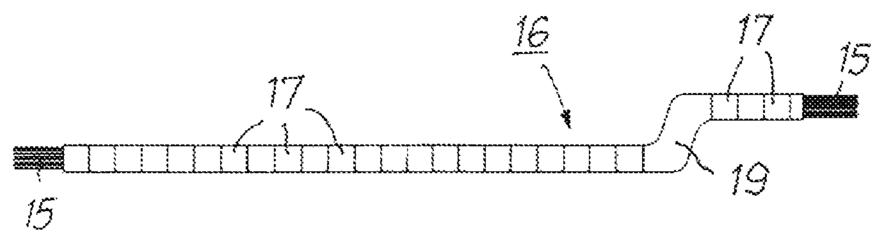
FIG. 5 shows, on an even larger scale, a guide chain for use in the arrangement according to the invention.

When the sliding door 2 is closed, the guide chain 16, in accordance with FIG. 3, is located with a major portion of its length below the guide groove 9 in the bottom area of the door opening 3, and above the guide groove 9 with a relatively short portion which is connected to the point of rotation 18. These different levels of the guide chain 16 relative to the bottom of the vehicle 1 are realized by an elbow 19 arranged along the length of the guide chain 16, which, as illustrated in FIG. 5, is approximately S-shaped.

By lifting the guide chain 16, and, thus, the lines 15 in the area of the connection point 14 to a raised level located above the guide groove 9, it is ensured that the travel carriage 5 can assume its end position 11 with the sliding door being fully open without being impeded during its movement by the guide chain 16, which is supposed to be arranged as much as possible in the lower portion of the vehicle 1. In addition, damage to the guide chain 16 and the lines 15 by the travel carriage 5 to the lines enclosed by the chain is prevented by the use of the elbow 19.

The invention claimed is:

1. A device for connecting functional elements that are arranged in a sliding door of a motor vehicle which, when the sliding door is in the closed position, closes a door opening, said functional elements being connected to at least one supply source present in the body of the motor vehicle by means of lines which extend between the functional elements and the supply source, wherein the sliding door is mounted on a carriage which can be moved back and forth in a bottom area of the body of the motor vehicle, essentially over the entire width of the door opening, wherein, in the area of the door opening of the motor vehicle, a connection point of the supply source is present for connecting the lines, wherein said device comprises:

a guide chain, in which said lines are disposed, said guide chain made of a plurality of mechanically stable chain links which are movably connected to each other, said guide chain being attached with a first end to the sliding door and with a second end in the area of the connection point to the body of the motor vehicle;

a substantially S-shaped elbow provided as one element of said guide chain, inserted between two of said plurality of mechanically stable chain links, said substantially S-shaped elbow being inserted along the extension of the guide chain in the area of the connection point to which the guide chain is pivotally attached, wherein the elbow raises the guide chain with its second end to a level which is above the carriage, while on the other side of the elbow the guide chain is arranged below the carriage when the sliding door is in the closed position.

2. The device according to claim 1, wherein either one of electrical and optical lines, as well as hoses, mounted in the guide chain.

* * * * *